United States Patent Office 3,804,847
Patented Apr. 16, 1974

3,804,847
HALOGENATION PROCESS
Keith Blakeney Mallion, Knutsford, England, assignor to Imperial Chemical Industries Limited, London, England
No Drawing. Filed Aug. 26, 1971, Ser. No. 175,400
Int. Cl. C07d 91/18
U.S. Cl. 260—306.7
10 Claims

ABSTRACT OF THE DISCLOSURE

Improvement to known halogenation process for manufacture of 2-imino-3-(2-halogeno-2-phenylethyl)thiazolidine derivative in which corresponding hydroxy derivative is reacted with a chlorinating or brominating agent, for example thionyl chloride, and then with sulphuryl chloride. Product has lower content of unwanted styryl by-product than that obtained by known halogenation process. Product can be ring-closed by a known process to give tetramisole having lower content of said by-product than that obtained by corresponding known process.

---

This invention relates to a chemical process and more particularly it relates to an improved process for the manufacture of tetramisole, i.e. dl-2,3,5,6-tetrahydro-6-phenylimidazo[2,1-b]thiazole, and pharmaceutically-acceptable acid-addition salts thereof.

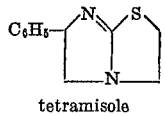

tetramisole

Tetramisole an its pharmaceutically-acceptable acid-addition salts are known to have useful anthelmintic properties. Furthermore, tetramisole is also useful as starting material for the preparation, by resolution, of the 1-isomer of tetramisole, which is likewise known to have useful anthelmintic properties.

A known, widely used process for the manufacture of tetramisole and pharmaceutically-acceptable acid-addition salts thereof comprises reacting 2-imino-3-(2-hyroxy-2-phenylethyl)thiazolidine, which has the formula:

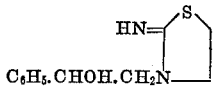

or an acid-addition salt thereof, with a chlorinating agent, for example thionyl chloride, phosphorus oxychloride or phosphorus pentachloride, to give 2-imino-3-(2-chloro-2-phenylethyl)thiazolidine, which has the formula:

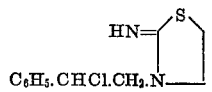

or an acid-addition salt thereof, and then reacting the latter compound with an alkaline substance, for example sodium carbonate, so as to effect ring-closure and give the desired product. This process has the disadvantage that the intermediate chloro-derivative of Formula III is contaminated with a significant amount (approximately 5% w./w.) of an unwanted impurity which is trans-2-imino-3-styrylthiazolidine (hereinafter called "IST"):

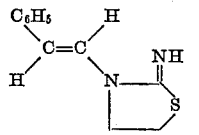

This impurity is unaffected in the final stage of the above process, and thus the tetramisole produced is contaminated to a significant extent (approximately 5% w./w.) with it. Accordingly, a special purification has to be effected to reduce the amount of this impurity to acceptable levels.

The subject of this invention is an improvement on the abovementioned known process which affords a product of the Formula I or III containing a much lower amount of IST.

According to the invention there is provided a process for the manufacture of a halogeno derivative of the formula:

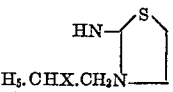

wherein X stands for a chlorine or bromine atom, and acid-addition salts thereof, which comprises reacting a hyroxy compound of the Formula II, or an acid-addition salt thereof, with a chlorinating or brominating agent, in an inert organic solvent, an then reacting the product with sulpuryl chloride in the same or a different inert organic solvent.

As a suitable salt of the compound of Formula II there may be mentioned, for example, the p-toluenesulphonate or hydrochloride. As a suitable chlorinating or brominating agent there may be mentioned, for example, thionyl chloride, thionyl bromide, phosphorus oxychloride, phosphorus oxybromide, phosphorus trichloride, phosphorus pentachloride, phosphorus tribromide, phosphorus pentabromide or chlorosulphonic acid. As a suitable organic solvent there may be mentioned, for example, a solvent which is a halogenated hydrocarbon, for example chlorobenzene or a halogenated alkaline of not more than 5 carbon atoms, for example ethylene dichloride, or an aromatic hydrocarbon solvent, for example toluene. The process of the invention is conveniently carried out at 20–80° C., and preferably at 40–50° C.

It is to be understood that the process of the invention can be carried out by either of two general procedures. In the first of these (and this is preferred because it affords the lowest amounts of IST in the product) the sulphuryl chloride is added to the reaction mixture some time after the chlorinating or brominating agent has been added, but before the chlorination or bromination reaction is complete. A preferred process of this type comprises the steps of adding thionyl chloride gradually over 10–20 minutes to the mixture of the compound of Formula II, or an acid-addition salt thereof, and solvent, for example chlorobenzene or toluene, at about 40° C., allowing the chlorination or bromination reaction to proceed for 30–45 minutes after the completion of the addition of the thionyl chloride, and then adding sulphuryl chloride over about 30 minutes, and then allowing the process to proceed at about 40° C. for about 3 hours, and then either isolating the product of Formula V or carrying out the ring-closure step so as to obtain tetramisole or a pharmaceutically-acceptable acid-addition salt thereof. Products have been obtained by this general procedure containing a maximum of 0.2% w./w. of IST. The other general procedure comprises adding the sulphuryl chloride to the reaction mixture when the chlorination or bromination reaction has ended. Products have been obtained by this general procedure containing a maximum of about 1.0% w./w. of IST.

It is to be understood that, if the ultimate desired product is tetramisole or a pharmaceutically-acceptable acid-addition salt thereof, there is no necessity to isolate the product of Formula V or the acid-addition salt thereof. Thus, if desired, without purification or isolation of the product of Formula V, the known ring-closure reaction can be carried out.

According to a further feature of the invention there is provided a process for the manufacture of tetramisole or a pharmaceutically-acceptable acid-addition salt thereof, which comprises the following steps:

(a) Reacting a hydroxy compound of the Formula II, or an acid-addition salt thereof, with a chlorinating or brominating agent in an inert organic solvent, and then reacting the product with sulphuryl chloride in the same or a different inert organic solvent; and (b) With or without partial purification of the resulting reaction mixture, adding an inorganic base to the reaction mixture and effecting ring-closure of the compound of the Formula V; and (c) Isolating the tetramisole produced either as the free base or as a pharmaceutically-acceptable acid-addition salt thereof.

The ring-closure Step (b) is well known, and a suitable inorganic base for use in it is, for example, an alkali metal hydroxide or carbonate, for example sodium hydroxide or sodium carbonate.

We have found that a significant further reduction in the amount of IST in the final product, i.e. a reduction over and above that resulting from the use of sulphuryl chloride as described above, can be achieved by converting the mixture of tetramisole and the contaminating IST into their hydrochlorides by treating a solution of the bases in toluene containing a relatively small amount of methanol, for example up to 20% v./v. of methanol, with hydrogen chloride gas. Both hydrochlorides are soluble in methanol, but, because of the preponderance of tetramisole hydrochloride in the mixture, at the expense of a relatively minor loss of tetramisole hydrochloride a significant reduction in the amount of IST hydrochloride can be effected.

The invention is illustrated by the following examples:

EXAMPLE 1

A stirred suspension of anhydrous sodium carbonate (5.3 g.) in toluene (150 ml.) was heated to reflux, and 50 ml. of solvent were distilled off. The suspension was cooled to 40° C. and 2 - imino - 3-(2-hydroxy-2-phenylethyl)thiazolidine p-toluenesulphonate (39.4 g.) was added. Thionyl chloride (8.0 ml.) was then added dropwise to the stirred suspension over 20 minutes, keeping the temperature at 40° C. The mixture was stirred and held at 40° C. for 3 hours. The amount of IST at this stage was approximately 5% w./w.

The temperature was then raised to 50° C., and sulphuryl chloride (1.34 ml.) was added rapidly. The mixture was stirred and held at 50° C. for 1¼ hours. Water (50 ml.) was then added and the mixture was stirred for 15 minutes. The suspension was filtered, and the solid residue successively washed with water (2× 25 ml.) and acetone (2× 50 ml.) and then dried for 1 hour at 70° C. There was thus obtained 2-imino-3-(2-chloro-2-phenylethyl)thiazolidine p-toluenesulphonate (hereinafter called "ICPT p-toluenesulphonate"), M.P. 195–197° C., which contained approximately 0.50% w./w. of IST p-toluenesulphonate.

EXAMPLE 2

The procedure described in Example 1 was repeated, but omitting the sodium carbonate and replacing the toluene by the same volume of chlorobenzene. There was thus obtained ICPT p-toluenesulphonate, M.P. 195–197° C., which contained approximately 0.4% w./w. of IST p-toluenesulphonate.

EXAMPLE 3

The procedure described in Example 1 was repeated up to and including the 1¼ hours period at 50° C. Water (100 ml.) was then added and the mixture was stirred for 10 minutes. Caustic liquor (100 Tw.°; 6 ml.) was added with stirring and the mixture temperature was raised to 60° C. More caustic liquor (100 Tw.°; approximately 6 ml.) was then added over 10–15 minutes to bring the pH to 9, at which point all the organic bases were in the toluene layer. Over the following 2½ hours at 60° C., more caustic liquor (100 Tw.°; 5–6 ml.) was added to keep the pH at 9. The layers were then separated. Water (100 ml.) was added to the organic layer, followed by diatomaceous earth (1 g.) and decolorizing carbon (1 g.). Concentrated hydrochloric acid (density 1.18; approximately 8.6 ml.) was then added with stirring to bring the mixture to pH 2–3. The mixture was stirred for 20–30 minutes and then filtered, and the phases in the filtrate were separated. The lower aqueous layer was removed and fresh toluene (100 ml.) was added to it. The mixture was stirred and heated to 50° C., and caustic liquor (100 Tw.°; approximately 5 ml.) was added dropwise to bring the pH to 9–10. The layers were separated and the aqueous layer was discarded. The organic layer was stirred at 50° C. for approximately 15 minutes in the presence of decolorizing carbon (1 g.) and anhydrous sodium sulphate (3 g.), and was then filtered. To the filtrate was added methanol (10% of the volume of the filtrate). The resulting solution was stirred at 45–50° C., and dry hydrogen chloride gas was bubbled through the solution until it had a pH 1–2 (pH tested with moist indicator paper). The precipitated white crystalline solid was filtered off, washed with acetone (3× 30 ml.), and dried at 65° C. There was thus obtained tetramisole hydrochloride, M.P. 255–256° C., containing 0.1% w./w. of IST hydrochloride.

EXAMPLE 4

A suspension of anhydrous sodium carbonate (5.3 g.) in toluene (150 ml.) was stirred and heated until 50 ml. of distillate were collected. The mixture was then cooled to 40° C. and powdered 2-imino-3-(2-hydroxy-2-phenylethyl)-thiazolidine p-toluenesulphonate (39.4 g.) was added. The stirred suspension was treated dropwise at 40° C. with a thionyl chloride (8 ml.) over 8 minutes. The mixture was then stirred and held at 40° C. for 4 hours. After 45 minutes into the holding period, sulphuryl chloride (1.34 ml.) was rapidly added. At the end of the holding period the mixture was worked up as described in Example 1 to give ICPT p-toluene-sulphonate, M.P. 195–197° C., containing approximately 0.1% w./w. of IST p-toluenesulphonate.

EXAMPLE 5

The procedure described in Example 3 was repeated, but replacing the chlorination and impurity removal steps by those described in Example 4. There was thus obtained tetramisole hydrochloride containing 0.01% w./w. of IST hydrochloride.

EXAMPLE 6

A suspension of 2-imino-3-(2-hydroxy-2-phenylethyl)-thiazolidine p-toluenesulphonate (39.4 g.) in dry ethylene dichloride (100 ml.) was stirred at 40° C. and thionyl chloride (8.0 ml.) was added dropwise over 20 minutes. When this addition was completed, the mixture was stirred for a further 30 minutes at 40° C., at which time thin layer chromatography indicated that the chlorination was complete. Sulphuyrl chloride (1.34 ml.) was then added rapidly. The mixture was held 2½ hours at 40° C. and then worked up as described in Example 1. There was thus obtained ICPT p-toluenesulphonate containing 0.1% w./w. of IST p-toluenesulphonate.

EXAMPLE 7

2-imino-3-(2 - hydroxy - 2 - phenylethyl)thiazolidine hydrochloride (25.9 g.) was added to dry ethylene dichloride at 40° C. The suspension was stirred at 40° C. and thionyl chloride (8 ml.) was added over 10–15 minutes. The mixture was stirred at 40° C. for 3 hours and then sulphuryl chloride (1.34 ml.) was added rapidly. After 2 hours at 40° C., water (200 ml.) was added and the mixture was heated to about 50° C. to dissolve all the hydrochlorides. The two-phase reaction mixture was then treated with a solution of p-toluenesulphonic acid (18.9 g.) in water (5 ml.) to precipitate the sparingly-soluble p-toluenesulphonate. This was filtered off, washed with acetone (2× 50 ml.), and dried. There was thus obtained ICPT p-toluenesulphonate containing 0.8% w./w. of IST p-toluenesulphonate.

EXAMPLE 8

The procedure described in Example 4 was repeated except that the sulphuryl chloride was added 1 hour after the end of the thionyl chloride addition. There was thus obtained ICPT p-toluenesulphonate containing approximately 0.25% w./w. of IST p-toluenesulphonate.

EXAMPLE 9

The procedure described in Example 4 was repeated except that the sulphuryl chloride was added immediately after the end of the thionyl chloride addition. There was thus obtained ICPT p-toluenesulphonate containing 0.65% w./w. of IST p-toluenesulphonate.

EXAMPLE 10

A stirred suspension of 2-imino-3-(2-hydroxy-2-phenylethyl)thiazolidine p-toluenesulphonate (19.7 g.) in ethylene dichloride (80 ml.) was heated to 40° C. and chlorosulphonic acid (3.5 ml.) was added dropwise over 4 minutes. The suspension was stirred and kept at 40° C., and after a further 45 minutes sulphuryl chloride (0.67 ml.) was added. The temperature of the stirred reaction mixture was kept at 40° C. for a further 3.25 hours. Water (60 ml.) was then added and the mixture stirred for 10 minutes. Caustic liquor (100 Tw.°; ca. 3 ml.) was added with stirring and the temperature raised to 60° C. More caustic liquor (100 Tw.°; ca. 8 ml.) was then added with stirring over the following 2.5 hours, so as to raise the pH of the mixture to 9, and to maintain it at this value, the temperature being kept at 60° C. After this time all the organic bases were in solution in the organic solvent. The layers were then separated. Water (60 ml.) was added to the organic layer, followed by diatomaceous earth (0.5 g.) and decolorizing carbon (0.5 g.). Concentrated hydrochloric acid (specific gravity 1.18; approximately 5 ml.) was added with stirring to bring the mixture to pH 1. The mixture was stirred for 30 minutes, filtered, and the phases in the filtrate separated. The aqueous phase was stirred and caustic liquor (100 Tw.°; ca. 3 ml.) added to bring the pH of the mixture to 9. The crystalline precipitate was filtered off and washed twice with 20 ml. of water each time. There was thus obtained tetramisole, M.P. 86–88° C., containing approximately 1.2% w./w. of IST.

EXAMPLE 11

To a stirred suspension of 2-imino-3-(2-hydroxy-2-phenylethyl)thiazolidine p-toluenesulphonate (19.7 g.) in ethylene dichloride (80 ml.) maintained at 40° C. was added phosphorus trichloride (1.9 ml.) over 1 minute. After 45 minutes sulphuryl chloride (1.35 ml.) was added. The stirred reaction mixture was maintained at 40° C. for a further 4 hours. Water (60 ml.) was then added and the mixture stirred for 10 minutes. The product was ring-closed and the resulting product worked up as described in Example 10, and there was obtained tetramisole, M.P. 87–89° C., containing approximately 1.0% w./w. of IST.

EXAMPLE 12

To a stirred suspension of 2-imino-3-(2-hydroxy-2-phenylethyl)thiazolidine p-toluenesulphonate (19.7 g.) in ethylene dichloride (80 ml.) maintained at 40° C. was added phosphorus tribromide (1.8 ml.) over 1 minute. After 45 minutes sulphuryl chloride (1.35 ml.) was added. The stirred reaction mixture was maintained at 40° C. for 2 hours. Water (60 ml.) was then added and the mixture stirred for 10 minutes. The product was worked up as described in Example 10 and there was obtained tetramisole, M.P. 88–90° C., containing approximately 0.9% w./w. IST.

EXAMPLE 13

A stirred suspension of 2-imino-3-(2-hydroxy-2-phenylethyl)thiazolidine p-toluenesulphonate (19.7 g.) in chlorobenzene (80 ml.) was heated to 40° C. and thionyl chloride (4 ml.) was added dropwise over 1 minute. The suspension was stirred and kept at 40° C. and after 45 minutes sulphuryl chloride (0.67 ml.) was added. The temperature of the stirred reaction mixture was kept at 40° C. for a further 3.25 hours. Water (60 ml.) was then added and the mixture stirred for 10 minutes. The product was worked up as described in Example 10 and there was obtained tetramisole, M.P. 87–89° C., containing approximately 0.18% w./w. IST.

What is claimed is:

1. A process for the manufacture of a halogeno derivative of the formula:

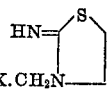

V wherein X stands for a chlorine or bromine atom, and acid-addition salts thereof, which comprises reacting a hydroxy compound of the formula:

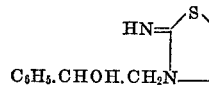

II or an acid-addition salt thereof, with a chlorinating or brominating agent, in an inert organic solvent, and then reacting the product with sulphuryl chloride in the same or a different inert organic solvent.

2. A process as claimed in claim 1 which comprises reacting a hydroxy compound of the Formula II, or an acid-addition salt thereof, at 20–80° C. with a chlorinating or brominating agent selected from the group consisting of thionyl chloride, thionyl bromide, phosphorus oxychloride, phosphorus oxybromide, phosphorus trichloride, phosphorus pentachloride, phosphorus tribromide, phosphorus pentabromide or chlorosulphonic acid, in an inert organic solvent selected from the group consisting of halogenated hydrocarbons and aromatic hydrocarbons, and then reacting the product at 20–80° C. with sulphuryl chloride in an inert organic solvent selected from the group consisting of halogenated hydrocarbons and aromatic hydrocarbons.

3. A process as claimed in claim 1 which comprises reacting a hydroxy compound of the Formula II, or a p-toluenesulphonate or hydrocholride thereof, at 40–50° C. with thioyl chloride in chlorobenzene, ethylene dichloride or toluene, and then adding sulphuryl chloride to the reaction mixture at 40–50° C., and then isolating the product of Formula V, wherein X stands for a chlorine atom, or a p-toluenesulphonate or hydrochloride thereof.

4. A process as claimed in claim 1 in which the sulphuryl chloride is added to the reaction mixture after the chlorinating or brominating agent has been added, but before the chlorination or bromination reaction is complete.

5. In a process for the manufacture of tetramisole or a pharmaceutically-acceptable acid-addition salt thereof, the step which comprises reacting a hydroxy compound of the Formula II, or an acid-addition salt thereof, with a chlorinating or brominating agent, in an inert organic solvent, and then reacting the product with sulphuryl chloride in the same or a different inert organic solvent.

6. In a process for the manufacture of tetramisole or a pharmaceutically-acceptable acid-addition salt thereof, the step which comprises reacting a hydroxy compound of the Formula II, or an acid-addition salt thereof, at 20–80° C. with a chlorinating or brominating agent selected from the group consisting of thionyl chloride, thionyl bromide, phosphorus oxychloride, phosphorus oxybromide, phosphorus trichloride, phosphorus pentachloride, phosphorus tribromide, phosphorus pentabromide and chlorosulphonic acid, in an inert organic solvent selected from the group consisting of halogenated hydrocarbons and aromatic hydrocarbons, and then reacting the product at 20–80° C. with sulphuryl chloride in an inert organic solvent selected from the group consisting of halogenated hydrocarbons and aromatic hydrocarbons.

7. In a process for the manufacture of tetramisole or a pharmaceutically-acceptable acid-addition salt thereof, the step which comprises reacting a hydroxy compound of the Formula II, or a p-toluenesulphonate or hydrochloride thereof, at 40–50° C. with thionyl chloride in chlorobenzene, ethylene dichloride or toluene, and then adding sulphuryl chloride to the reaction mixture at 40–50° C.

8. A process for the manufacture of tetramisole or a pharmaceutically-acceptable acid-addition salt thereof, which comprises the following steps:
  (a) reacting a hydroxy compound of the Formula II, or an acid addition salt thereof, with a chlorinating or brominating agent in an inert organic solvent, and then reacting the product with sulphuryl chloride in the same or a different inert organic solvent; and
  (b) with or without partial purification of the resulting reaction mixture, adding an inorganic base to the reaction mixture and effecting ring-closure of the compound of the Formula V; and
  (c) isolating the tetramisole produced either as the free base or as a pharmaceutically-acceptable acid-addition salt thereof.

9. A process as claimed in claim 8 for the manufacture of tetramisole or a pharmaceutically-acceptable acid-addition salt thereof, which comprises the following steps:
  (a) reacting a hydroxy compound of the Formula II, or an acid addition salt thereof, at 20–80° C. with a chlorinating or brominating agent selected from the group consisting of thionyl chloride, thionyl bromide, phosphorus oxychloride, phosphorus oxybromide, phosphorus trichloride, phosphorus pentachloride, phosphorus tribromide, phosphorus pentabromide and chlorosulphonic acid, in an inert organic solvent selected from the group consisting of halogenated hydrocarbons and aromatic hydrocarbons, and then reacting the product at 20–80° C. with sulphuryl chloride in an inert organic solvent selected from the group consisting of halogenated hydrocarbons and aromatic hydrocarbons; and
  (b) with or without partial purification of the resulting reaction mixture, adding an inorganic base to the reaction mixture and effecting ring-closure of the compound of the Formula V; and
  (c) isolating the tetramisole produced either as the free base or as a pharmaceutically-acceptable acid-addition salt thereof.

10. A process as claimed in claim 8 for the manufacture of tetramisole or a pharmaceutically-accetpable acid-addition salt thereof, which comprises the following steps:
  (a) reacting a hydroxy compound of the Formula II, or a p-toluenesulphonate or hydrochloride thereof, at 40–50° C. with with thionyl chloride in chlorobenzene, ethylene dichloride or toluene, and then adding sulphuryl chloride to the reaction mixture at 50–50° C.; and
  (b) with or without partial purification of the resulting reaction mixture, adding an alkali metal hydroxide or carbonate to the reaction mixture and effecting ring-closure of the compound of Formula V wherein X stands for a chlorine atom; and
  (c) isolating the tetramisole produced either as the free base or as a pharmaceutically-acceptable acid-addition salt thereof.

References Cited
UNITED STATES PATENTS

| | | | |
|---|---|---|---|
| 3,478,047 | 11/1969 | Doyle et al. | 260—306.7 |
| 3,679,696 | 7/1972 | Bullock | 260—306.7 |

OTHER REFERENCES

Wagner et al., Synthetic Organic Chemistry, N.Y., Wiley, 1953, pp. 98–9, 105–6.

RICHARD J. GALLAGHER, Primary Examiner

UNITED STATES PATENT OFFICE
CERTIFICATE OF CORRECTION

Patent No. 3,804,847   Dated April 16, 1974

Inventor(s) Keith Blakeney Mallion

It is certified that error appears in the above-identified patent and that said Letters Patent are hereby corrected as shown below:

In the heading, Foreign application Priority Data should be added as follows:

-- Great Britain   No. 45575/70   September 24, 1970--

Column 1, line 34, "an" should read --and--

Column 1, line 42, "hyroxy" should read --hydroxy--

Column 2, line 13, formula V should read

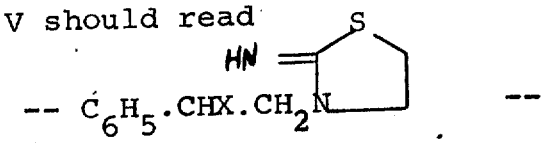

Column 2, line 18, "hyroxy" should read --hydroxy--

Column 2, line 21, "an", second occurrence should read -- and --

Column 2, line 22, "sulpuryl" should read --sulphuryl--

Column 2, line 34, "alkaline" should read --alkane--

Column 4, line 60, "Sulphuyrl" should read --Sulphuryl--

Column 6, line 51, "hydrocholride" should read --hydrochloride--

Column 6, line 52, "thioyl" should read --thionyl--

Column 8, line 18, delete one "with"

Signed and sealed this 1st day of October 1974.

(SEAL)
Attest:

McCOY M. GIBSON JR.
Attesting Officer

C. MARSHALL DANN
Commissioner of Patents